(12) United States Patent
Montenegro

(10) Patent No.: US 11,120,121 B1
(45) Date of Patent: Sep. 14, 2021

(54) PROGRESSIVE DEFENSES AT AN AUTOMATED TELLER MACHINE

(71) Applicant: Wells Fargo Bank, N.A., San Francisco, CA (US)

(72) Inventor: Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 38 days.

(21) Appl. No.: 16/215,301

(22) Filed: Dec. 10, 2018

(51) Int. Cl.
*G06F 21/45* (2013.01)
*G06Q 20/10* (2012.01)
*G06F 21/31* (2013.01)

(52) U.S. Cl.
CPC .............. *G06F 21/45* (2013.01); *G06F 21/31* (2013.01); *G06Q 20/1085* (2013.01)

(58) Field of Classification Search
None
See application file for complete search history.

(56) References Cited

U.S. PATENT DOCUMENTS

| | | | |
|---|---|---|---|
| 5,214,411 | A | 5/1993 | Herbruck |
| 5,685,636 | A | 11/1997 | German |
| 6,191,693 | B1 | 2/2001 | Sangsingkeow |
| 6,575,597 | B1 | 6/2003 | Cramer et al. |
| 7,026,942 | B2 | 4/2006 | Cristofori et al. |
| 7,948,386 | B2 | 5/2011 | Weiser et al. |
| 8,635,806 | B2 | 1/2014 | Gardner et al. |
| 9,439,412 | B2 | 9/2016 | Kittelson |
| 9,675,059 | B2 | 6/2017 | Waldman et al. |
| 10,373,246 | B1 * | 8/2019 | Groenjes ................ G06Q 40/00 |
| 2003/0156027 | A1 * | 8/2003 | Seo ....................... G08B 13/191 340/523 |
| 2012/0066957 | A1 | 3/2012 | Gaibotti |
| 2012/0113754 | A1 | 5/2012 | Husseiny et al. |
| 2014/0337930 | A1 * | 11/2014 | Hoyos .................... G06F 21/34 726/4 |
| 2017/0344993 | A1 * | 11/2017 | Stewart .............. G06Q 20/3224 |
| 2018/0040209 | A1 * | 2/2018 | Lim ........................ H02S 10/12 |

OTHER PUBLICATIONS

Trend Micro, Cashing in on ATM Malware (Year: 2017).*
Shriram, S., et al. "Smart ATM surveillance system" 2016 International Conference on Circuit, Power and Computing Technologies (ICCPCT). IEEE (Year: 2016).*
Smart ATM surveillance system 2016 International Conference on Circuit, Power and Computing Technologies (ICCPCT) (Year: 2016).*

* cited by examiner

*Primary Examiner* — David P Sharvin
*Assistant Examiner* — Brock E Turk
(74) *Attorney, Agent, or Firm* — Foley & Lardner LLP

(57) ABSTRACT

Examples described herein relate to apparatuses and methods of providing automated teller machine (ATM) security. A method includes detecting, by the ATM, an intruder proximate the ATM using sensed detection information, determining intruder type information based on the sensed detection information, transmitting the intruder type information to a provider computing system, receiving an instruction to use a level of security defense measure based on the intruder type information, using the level of security defense measure, monitoring a movement of the intruder in response to the level of security defense measure, and in response to the movement of the intruder, determining whether to use an increased level of security defense measure.

23 Claims, 7 Drawing Sheets

PROGRESSIVE DEFENSES AT AN AUTOMATED TELLER MACHINE

TECHNICAL FIELD

Embodiments of the present disclosure relate generally to the field of security of automated teller machines (ATMs).

BACKGROUND

ATMs or other payment terminal devices may be physically compromised by the intrusion of animals, insects, birds, humans, or other types of intruders. In some cases, animals, such as rodents, may be able to enter into an ATM and cause damage to media stored therein (e.g., cash, checks, cards, stamps) as well as potentially to the hardware inside the ATM. Thus, the physical security of ATM equipment and cash or other media stored therein may be at risk. Conventional ATMs do not employ security measures against such intrusions. In addition to providing security measures, conventional ATMs also are unable to determine the type of intruder or level of security that should be used for a certain type of intruder.

SUMMARY

A first example embodiment relates to a method. The method includes detecting, by the ATM, an intruder proximate the ATM using sensed detection information, determining intruder type information based on the sensed detection information, transmitting the intruder type information to a provider computing system, receiving an instruction to use a level of security defense measure based on the intruder type information, using the level of security defense measure, monitoring a movement of the intruder in response to the level of security defense measure, and in response to the movement of the intruder, determining whether to use an increased level of security defense measure.

Another example embodiment relates to an ATM. The ATM includes a network interface, an input/output device, a security device configured to use security defense measures against an intruder detected proximate the ATM, and a processing circuit including one or more processors coupled to non-transitory memory. The processing circuit configured to detect the intruder proximate the ATM using sensed detection information, determine intruder type information based on the sensed detection information, transmit the intruder type information to a provider computing system, receive an instruction to use a level of security defense measure based on the intruder type information, operate the security device to use the level of security defense measure, monitor a movement of the intruder in response to the level of security defense measure, and in response to the movement of the intruder, determine whether to use an increased level of security defense measure.

Another example embodiment relates to a provider computing system. The provider computing system includes a network interface and a processing circuit including one or more processors coupled to non-transitory memory, the memory including an automated teller machine (ATM) database. The processing circuit is configured to receive an indication of an intruder from an ATM, receive intruder type information from the ATM, determine a level of security defense measure to be used at the ATM based on the intruder type information, transmit an instruction message to the ATM to use the level of security defense measure, receive feedback information from the ATM, the feedback information including movement of the intruder in response to the level of security defense measure used, and determine whether to instruct the ATM to use an increased level of security defense measure based on the movement of the feedback information.

Another example embodiment relates to a mobile device. The mobile device includes a network interface circuit structured to communicate data to and from a provider computing system associated with a provider, an input/output device structured to exchange data with a user, and a processing circuit comprising a processor and memory. The processing circuit is structured to receive, by the input/output device, an authorization request including user identity information, the authorization request including a request to physically access an ATM, transmit, by the network interface circuit, the authorization request to the provider computing system, receive, by the network interface circuit, an authorization approval message from the provider computing system, and generate and display, by the input/output device, a user interface comprising an approval message indicating to the user that the user is approved to physically access the ATM.

These and other features, together with the organization and manner of operation thereof, will become apparent from the following detailed description when taken in conjunction with the accompanying drawings.

DETAILED DESCRIPTION

Figure 1:
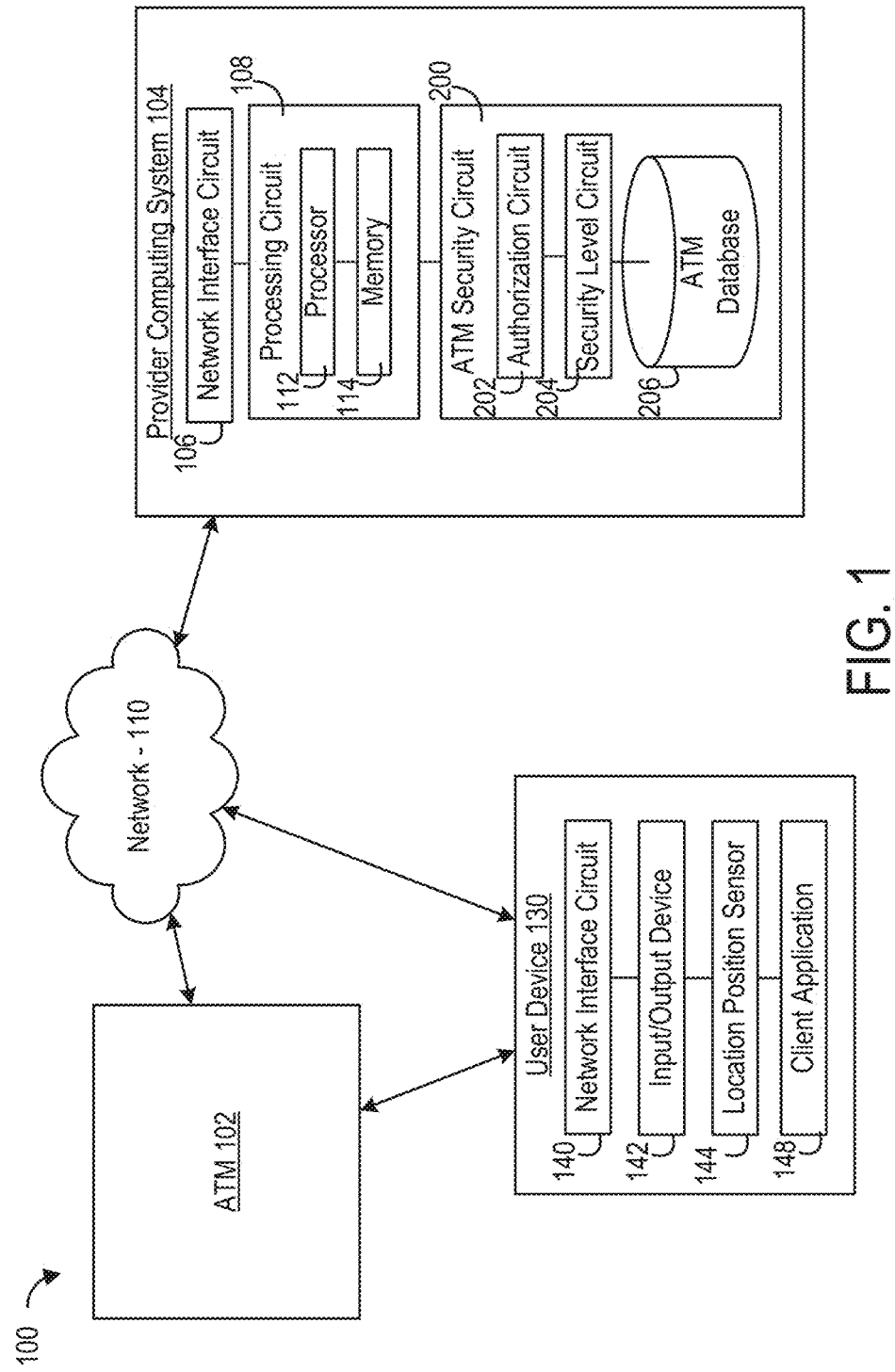
FIG. 1 is a block diagram depicting an example environment for providing ATM security management, according to an example embodiment.

Referring to the figures generally, systems and methods of providing security measures against various types of intruders are described. Based on the detection of a type of intruder, the system described herein can tailor a security defense measure to effectively deter the intruder from attempting to physically access the ATM. For example, an animal, such as a rodent, may approach and attempt to enter the ATM (e.g., through various openings in the ATM housing). The system detects that the approaching intruder is a rodent or a small animal and determines a level or type of security measure to use for deterrence. The intruder may move in a certain way and may be of a certain size such that various sensors and/or cameras in use with the ATM can detect the particular type of intruder. Upon detection of the intruder and determination of a security defense measure, the system monitors the actions of the intruder taken after the deployment of the security defense measure. The system determines by feedback from the various sensors and/or cameras whether the intruder has been deterred. If the intruder is retreating, the system may not take any further action. However, if the intruder is persistent and continues to approach or attempt to enter the ATM, the system may determine further action to take. In some instances, the further action is to increase a level of security defense measure, such as increasing the intensity of or changing the type of security defense measure used in a progressive manner. In some embodiments described herein, a user attempting to provide maintenance and repairs to the ATM may approach the ATM (e.g., with a user device). The system determines that the user is an authorized user and allows the user to physically access the ATM to perform any necessary maintenance and repair procedures. To do this, the system may temporarily disable the security defense measures of the ATM.

The embodiments described herein solve the technical problem of detecting potential intrusion of or tampering with an ATM's components or media stored therein that may otherwise go unnoticed by a provider of the ATM until a period of scheduled maintenance or upon receipt of reports from users attempting to use the ATM. By leveraging real-time information sets, including sensor and camera feedback information, the systems and methods described herein facilitate the detection of intruders, which could potentially lead to damage of ATM components or contents. The system also provides varying levels of security measures based on the type of intruder as well as based on how the intruder responds to the security measures, where the information is gathered in real-time using multi-sensory devices at the ATM. The system therefore may use artificial intelligence to implement progressive levels of security measures for an ATM. Using real-time sensor and camera feedback, the system can stop the intruder before there is a chance to do any damage to the ATM components or contents. Accordingly, the provider of the ATM saves time because they do not need to make trips to the ATM location to deter any intruders and saves money on potential labor, repairs to the ATM components, and any replacement of media within the ATM. In some arrangements, as used herein, the term ATM also includes various types of vaults or other secured devices storing currency or other types of media accessible through authentication or authorization of an individual. These various devices may employ the security defense measures described herein in a similar manner such that intruders which approach or attempt to access the device are deterred in a progressive, real-time manner.

Referring to FIG. 1, an ATM management system 100 is shown, according to an example embodiment. The management system 100 includes, among other systems, an ATM 102, a provider computing system 104, and in some cases, a user device 130. The ATM 102, provider computing system 104, and user device 130 may communicate directly or through a network 110, which may include one or more of the Internet, cellular network, Wi-Fi, Wi-Max, a proprietary banking network, or any other type of wired or wireless network.

The ATM 102 is a computing system configured to provide an interface between a user and the provider computing system 104, allowing the user to access information at and perform transactions with the corresponding provider. For example, in various arrangements, the ATM 102 is configured to allow a customer to view account balances, deposit checks, transfer funds, or withdraw funds from a given account in the form of cash. In some embodiments, the ATM 102 is disposed at a brick and mortar banking facility associated with the provider. In other embodiments, the ATM 102 is a standalone computing terminal (e.g., disposed at an unrelated retail facility, within an office building). The ATM 102 includes hardware and associated logics enabling contactless data transfers, for example, using radio frequency identification ("RFID") and/or NFC.

Still referring to FIG. 1, according to an embodiment of the disclosure, the ATM 102 is owned and operated by the provider associated with the provider computing system 104. The ATM 102 performs various functions in response to an interaction with a user (e.g., user managing user device 130). In some embodiments, the ATM 102 is capable of both receiving deposits and dispensing funds. For example, the ATM 102 may include a currency dispenser that is used to dispense currency when the user wishes to perform a cash withdrawal. The ATM 102 may also include a deposit slot that is configured to receive paper currency and checks when the user wishes to make a deposit. The ATM 102 may also be configured to perform other operations, such as allowing the user to check account balances, purchase stamps, and so on. The ATM 102 can include a transaction card slot configured to receive a transaction card inserted by a user. The ATM 102 may further include a keypad, or similar user input device, containing a number of buttons (e.g., alphanumeric, etc.) configured to receive input (e.g., a PIN) from a user. To initiate a transaction with the ATM 102, a user may insert an ATM card into a transaction card slot of the ATM 102. In another embodiment, to initiate a transaction with the ATM 102, a user may approach the ATM with the user device 130. The ATM 102 is further described herein with regard to FIG. 2.

The user device 130 is a computing device associated with a user. In some arrangements, the user is an account holder of at least one account (e.g., checking account, a savings account, a credit account, an investment account, a retirement account, a brokerage account, a mortgage account, a rewards account, etc.) managed by the provider (associated with provider computing system 104). In some arrangements, the user is an account holder of a different entity. In some arrangements, the user is an employee of the provider and may be employed to perform maintenance, repairs, or oversee general operation of the ATM 102. In some arrangements, the user is a security guard positioned proximate one or more ATMs 102.

The user device 130 includes any type of computing device that may be used to conduct transactions and/or communicate with the provider computing system 104 and/or the ATM 102. In some arrangements, the user uses the user device 130 to both communicate information to the ATM 102 over the network 110 as well as communicate information with the provider computing system 104. In this regard, the user device 130 may include any wearable or non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), ring, etc. The user device 130 may also include any type of mobile device including, but not limited to, a phone (e.g., smart phone, etc.), tablet, personal digital assistant, and/or computing devices (e.g., desktop computer, laptop computer, personal digital assistant, etc.).

Still referring to FIG. 1, the user device 130 includes a network interface 140 enabling the user device 130 to exchange information over the network 110, an input/output device 142, a location position sensor 144, and a client application 148. The input/output device 142 is configured to exchange information with the user. An input device or component of the input/output device 142 allows the user to provide information to the user device 130, and may include, for example, a mechanical keyboard, a touchscreen, a microphone, a camera, a fingerprint scanner, any user input device engageable with the user device 130 via a USB, serial cable, Ethernet cable, and so on. An output device or component of the input/output device 142 allows the user to receive information from the user device 130, and may include, for example, a digital display, a speaker, illuminating icons, LEDs, and so on.

The location position sensor 144 is structured to receive location data and determine a location or receive information indicative of a location of the user device 130. In one embodiment, the location position sensor 144 includes a global positioning system (GPS) or any other type of location positioning system. As such, the location position sensor 144 receives latitude data, longitude data, and any other type of location or position data to determine the location of the user device 130. In other embodiments, the location position sensor 144 receives an explicit location identification from the user of the user device 130. All such variations are intended to fall within the spirit and scope of the present disclosure.

The client application 148 is structured to provide displays to the user device 130 that enable the user to manage interactions with the ATM 102 and may be used to manage accounts held with the provider. Accordingly, the client application 148 is communicably coupled to the provider computing system 104 (e.g., the ATM security circuit 200, etc.). In some embodiments, the client application 148 may be incorporated with an existing application in use by the provider (e.g., a mobile banking application or a mobile wallet application). In other embodiments, the client application 148 is a separate software application implemented on the user device 130. The client application 148 may be downloaded by the user device 130 prior to its usage, hard coded into the memory of the user device 130, or be a web-based interface application such that the user device 130 may provide a web browser to the application, which may be executed remotely from the user device 130. In the latter instance, the user may have to log onto or access the web-based interface before usage of the applications. Further, and in this regard, the client application 148 may be supported by a separate computing system including one or more servers, processors, network interface circuits, etc. that transmit applications for use to the user device 130. In certain embodiments, the client application 148 includes an API and/or a software development kit (SDK) that facilitate the integration of other applications with the client application 148. For example, the client application 148 may include an API that facilitates the receipt of information pertaining to the security of the ATM 102 as described further below.

The displays presented to the user via the client application 148 may be indicative of ATM security information, user authorization information, current account balances, pending transactions, profile information (e.g., contact information), and the like. The client application 148 may also provide an authorization request to the user to complete an authorization to access the ATM 102. For example, the client application 148 may prompt the user to login to authorize access to the ATM 102. Further, in some embodiments, the client application 148 is also structured to present displays pertaining to the status of an ATM (e.g., whether the ATM requires maintenance or repairs, whether the ATM has used security defense measures, etc.). For example, the user may be an authorized employee of the provider and the client application 148 may be configured to present the user with a log of security defense measures which have been used at a particular ATM 102.

The user may visit an ATM 102 with the user device 130. For example, in some arrangements, the user carries the user device 130 to the ATM 102. Depending on the purpose of the user's visit to the ATM 102, the customer may access a specific interface of the application being executed on the user device 130. For example, if the purpose of the visit is to withdraw cash from an ATM 102, the user may be able to pre-stage the ATM transaction through an ATM user interface of the client application 148.

As another example, if the purpose of the visit is to perform maintenance on or repair to the ATM 102, the user or user device 130 may initiate an authorization request prior to approaching the ATM 102 to request access of the ATM 102 from the provider computing system 104. As such, when the user approaches the ATM 102 in this case, the ATM 102 may detect the user device 130 and transmit an authorization request to the provider computing system 104. The ATM security circuit 200 (e.g., authorization circuit 202) may determine that the user is an authorized user and if so, will not employ any security defense measures, thereby allowing the user to physically access the ATM 102 and/or various components of the ATM 102. In addition, the user device 130 receives an authorization approval message from the provider computing system and generates and displays a user interface including an approval message to the user that the user is approved to physically access the ATM without the possibility of a security defense measure being used against the user.

The provider computing system 104 is operated by a provider, which is an entity that facilitates the transactions occurring at the ATM 102, as well as the maintenance, repairs, and overall operation of the ATM 102. In some embodiments, the provider computing system 104 also facilitates various types of transactions between the user device 130 and the ATM 102, and between the user device 130 and various other entities. In some embodiments, the provider computing system 104 manages the debit and/or credit card held by a user requesting funds from the ATM 102. For example, the provider may be a bank, credit union, a payment services company, or other similar entities. The provider computing system 104 includes, among other systems, a network interface 106 enabling the provider computing system 104 to exchange data over network 110, a processing circuit 108, and an ATM security circuit 200.

The processing circuit 108 includes a processor 112 and memory 114. The processor 112 may be implemented as one or more application specific integrated circuits (ASICs), field programmable gate arrays (FPGAs), a group of processing components, or other suitable electronic processing components. Memory 114 may be one or more devices (e.g., RAM, ROM, Flash memory, hard disk storage) for storing data and/or computer code for completing and/or facilitating the various processes described herein. Memory 114 may be or include non-transient volatile memory, non-volatile memory, and non-transitory computer storage media. Memory 114 may include database components, object code components, script components, or any other type of information structure for supporting the various activities and information structures described herein. Memory 114 may be communicably coupled to the processor 112 and include computer code or instructions for executing one or more processes described herein.

Still referring to FIG. 1, the provider computing system 104 is further shown to include an ATM security circuit 200. The ATM security circuit 200 is configured to determine whether an intruder is approaching or attempting to physically access the ATM, as well as determine certain security defense measures in response to that determination and instruct the ATM 102 to perform those security measures. As illustrated in FIG. 1, the provider computing system 104 includes an ATM security circuit 200 that is integrated within or otherwise communicable with, the provider computing system 104. In another embodiment, the ATM security circuit 200 may be included with the ATM 102 instead. In still another embodiment, the ATM security circuit 200 may be included partially with the ATM 102 and partially with the provider computing system 104, with some circuits or components provided with the ATM 102 and some circuits or components provided with the provider computing system 104.

The ATM security circuit 200 is shown, according to an example embodiment. The ATM security circuit 200 includes an authorization circuit 202, a security level circuit 204, and an ATM database 206. While various circuits, interfaces, and logic with particular functionality are shown, it should be understood that the ATM security circuit 200 includes any number of circuits, interfaces, and logic for facilitating the functions described herein. For example, the activities of multiple circuits are combined as a single circuit and implemented on the same processing circuit.

The ATM database 126 is structured to retrievably store information pertaining to an inventory of ATMs 102 and historical security defense measure information for each ATM 102. The ATM database 126 may include non-transient data storage mediums (e.g., local disc or flash-based hard drives, local network servers, and the like) or remote data storage facilities (e.g., cloud servers). The ATM database 126 stores information regarding the make and model, location, and status of ATMs 102 including whether the ATM 102 is operational and whether the ATM 102 has used security defense measures in the past. The ATMs 102 stored in the ATM database 126 can include both ATMs 102 owned and operated by the provider and ATMs owned and operated by other third party providers. In various arrangements, historical security information may include an ATM identifier, the date and time of a reported ATM status, the location of the ATM, the make and model of the ATM, the type of intruder detected, the type of security measure used for a particular intruder, whether the security measure was successful, the number of times a security measure has been used at the ATM, etc.

The authorization circuit 202 is configured to authorize physical access of the ATM 102 by a user approaching or proximate the ATM 102. The authorization circuit 202 receives a request for physical access to the ATM 102. In some arrangements, the authorization circuit 202 receives the request directly from the user device 130. In some arrangements, the authorization circuit 202 receives the request from the ATM 102, which has detected the approach of a user with an authorized user device 130 or which has received a request from the user device 130 to initiate the authorization. Accordingly, the authorization circuit 202 is communicably and operatively coupled to the ATM 102 and the user device 130 to receive such a request.

For example, the authorization circuit 202 receives an authorization request from the client application 148 of the user device 102, determines the identity of the user, and completes the authorization of the user to access the ATM by temporarily disabling the security defense measures of the ATM 102. Accordingly, the authorization circuit 202 is communicably and operatively coupled to the security circuit 124 of the ATM 102 to temporarily disable the use of security measures. In some arrangements, the authorization request is completed based on the authorization circuit 202 retrieving user and user device identification information from a database (e.g., ATM database 206) included with the provider computing system 104. For example, the user may be an employee of the provider requesting access to an ATM 102 to perform maintenance and/or repairs such that the provider computing system 104 has previously stored user and user device identification information for later access. In another example, the authorization circuit 202 also receives location information of the user device 130 from the location position sensor 144 of the user device 130. Using the location information of the user device 130, the authorization circuit 202 determines the approximate location of one or more ATMs 102 near the position of the user device 130 and temporarily disables the security measures of those ATMs 102.

The security level circuit 204 is configured to determine a level of security defense measure that is used by the ATM 102. The security level circuit 204 receives sensed object or intruder information from the detection circuit 122 (FIG. 2) of the ATM 102 and based on the type of object or intruder and the historical security information for the ATM 102, determines a level of security defense measure. Accordingly, the security level circuit 204 is communicably and operatively coupled to the ATM 102 (e.g., detection circuit 122) to receive the sensed object or intruder information. Additionally, the security level circuit 204 is communicably and operatively coupled to the ATM database 206 included with the provider computing system 104 to retrieve historical data. The security level circuit 204 is also configured to determine whether the level of security measure should be progressively increased to a next level based on the continued monitoring of the intruder activity at the ATM 102 (e.g., by the camera 132 and sensor 134). For example, if the intruder is not retreating and continues to pursue physical access to the ATM 102, the security level circuit 204 may determine to increase the level of security defense measure from a previously used level. As another example, if the intruder is deterred (e.g., rodent runs away from the ATM 102), the security level circuit 204 determines that the level of security defense measure does not need to be increased and instead, that no security measure is necessary at that time. The security level circuit 204 is configured to continuously store or log the security information in the ATM database 206, including but not limited to, the number of security defense measures used, the types of security defense measures, the types of intruders, and whether the security defense measure was successful in deterring the intruder.

As an example, the security level circuit 204 receives an indication from the detection circuit 122 that a small animal is detected. The security level circuit 204 determines that a first level of security defense measure should be used to attempt to deter the small animal. The security level circuit 204 determines that, based on the type of intruder, the security defense measure should be a noise emission, such as ultrasonic sounds. The security level circuit 204 generates and transmits a message identifying the specific security defense measure to the security circuit 124 of the ATM 102, which in turn, communicates with the security device 136 to complete the security defense measure. In this example, the security device 136 controls components of the ATM 102 (e.g., a speaker) to create an ultrasonic sound.

As a further example, in the same sequence of events, the security level circuit 204 receives a second indication from the detection circuit 122 that the small animal is persistently attempting to enter the ATM 102 and is disregarding the first level of security defense measure (e.g., ultrasonic sound). The security level circuit 204 determines that a second level of security defense measure, such as an increased level of noise emission or an odor emission, is necessary to deter the animal. The security level circuit 204 stores this information in the ATM database 206 and generates and transmits a message to the security circuit 124 to complete the security defense measure.

As another example, the security level circuit 204 receives an indication of a human intruder (e.g., human crouching near an access panel of the ATM 102 for a prolonged period of time) from the detection circuit 122. The security level circuit 204 determines that an alarm type of security defense measure should be used and communicates as such to the security circuit 124. In other arrangements, the security level circuit 204 may not use an audible or visible defense mechanism and instead, may contact security services of the provider and/or law enforcement to be deployed to the ATM 102. As another example, the security level circuit 204 receives communication from the authorization circuit 202 that a user associated with the provider has been authorized to physically access the ATM 102 (e.g., via an authorization request received from the user device 130). In this way, the security level circuit 204 may temporarily disable all security defense measures in response to the authorization of the user.

Figure 2:
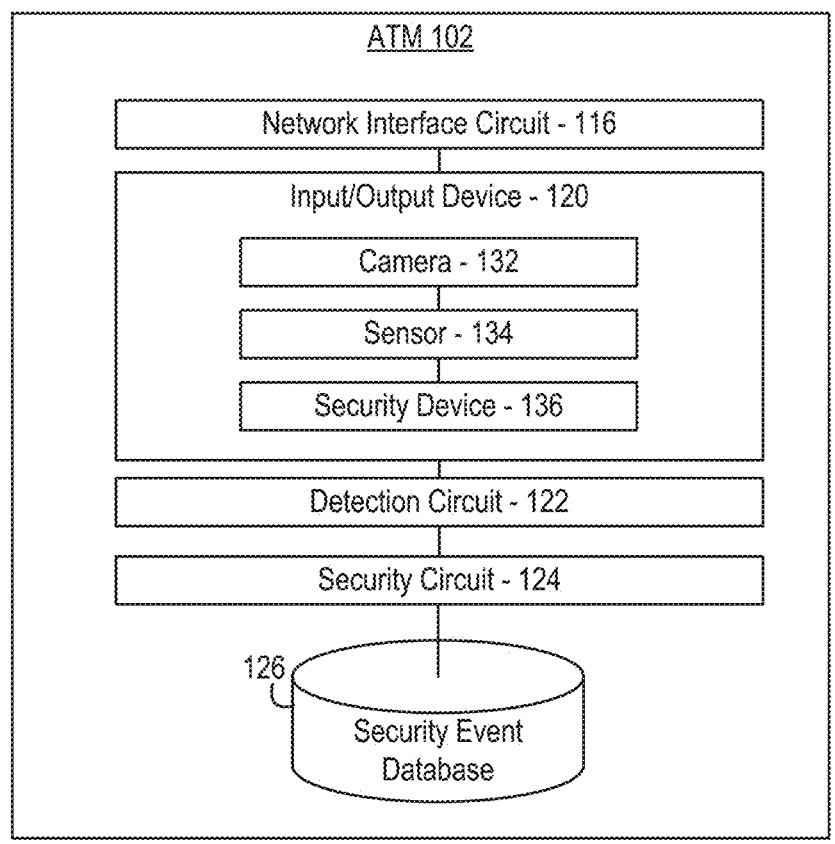
FIG. 2 is a block diagram depicting an ATM of the environment in FIG. 1, according to an example embodiment.

Referring to FIG. 2, the ATM 102 is shown, according to an example embodiment. The ATM 102 includes a network interface circuit 116 and an input/output device 118. The network interface circuit 116 enables the ATM 102 to exchange data over the network 110. As such, the network interface circuit 116 allows the ATM 102 to exchange data to remote computing devices (e.g., the provider computing system 104, user device 130).

The input/output device 120 includes one or more devices and associated logic configured to allow a user to exchange information and interact with the ATM 102, as well as to monitor the area in and around the ATM 102 for intruders, and provide security defense measures for the ATM 102. For example, an input aspect of the input/output device 120 can include a magstripe reader, a keyboard, a touchscreen, a microphone, a camera, a fingerprint scanner, any user input device engageable with the ATM 102 via a USB, serial cable, and so on.

In addition, the ATM 102 can include a camera 132 to monitor real-time activity surrounding the ATM 102. For example, the camera 132 can record the activity occurring proximate the ATM 102, which can then be analyzed by the various circuits included with the ATM 102 and can be transmitted to the provider computing system 104 for analysis and storage. The ATM 102 can also include various sensors 134 which are configured to detect movement and proximity of objects near the ATM 102. For example, a motion detector sensor is included with the ATM 102 to detect movement of objects near the ATM 102. In various arrangements, motion detector sensors include, but are not limited to, passive infrared sensors, microwave motion detectors, ultrasonic detectors, proximity sensors, heat detectors, etc., which are used to detect movement proximate the ATM 102. In some arrangements, the sensor 134 and camera 132 can be used in a combined arrangement such that operation of the camera 132 is triggered by the sensor 134. As such, upon the detection of an object, the sensor 134 can communicate a detection signal to the camera 132, which begins recording the activity near the ATM 102 in response to the communicated detection. In some arrangements, the output of the camera 132 is used to detect motion. In some arrangements, the motion detector sensor also senses the placement and size of the object. Thus, the motion detector sensor can capture this information and communicate the object information to the detection circuit 122 described further herein.

The input/output device 120 also includes a security device 136. The security device 136 is configured to perform a security defense measure to deter intruders detected at, in, or near the ATM 102. In one example, the security device 136 includes a noise emission device. The noise emission device may emit an alarm, ultrasonic sounds that can only be heard by certain animals, sounds of predators, etc. In another example, the security device 136 includes an odor emission device. The odor emission device may emit the smell of a predator, pheromones, unpleasant smells (e.g., skunk smells) in the case of human detection, etc. In yet another example, the security device 136 includes a light. The light may be a motion detection light responsive to detection of motion by the sensor 134. The light could be a strobe light. In still another example, the security device 136 includes a chemical emission device. In this case, the security device 136 may emit an insecticide upon the detection of insects or an animal/pest deterrent upon the detection of a small animal. In some cases, the security device 136 may also include a robotic device, such as a robotic arm that moves, for example, if birds are detected landing on or near the device (e.g., to scare away the birds). The input/output device 120 can also include a digital display, a speaker, illuminating icons, LEDs, a cash dispenser, a paper (e.g., receipts) dispenser, and so on.

The ATM 102 further includes a detection circuit 122, a security circuit 124, and a security event database 126, all communicably coupled to each other. The detection circuit 122 is configured to receive an indication of the presence of an intruder near the ATM 102 (e.g., rodents approaching or climbing on the ATM, pigeons landing on the ATM, a human crouching near an access panel for a period of time, etc.) from the camera 132 and/or sensor 134 of the input/output device. Accordingly, the detection circuit 122 is communicably and operatively coupled to the input/output device 120 and components thereof, such as the camera 132 and the sensor 134 to receive the detected object information. The detection circuit 122 is configured to determine the type of intruder based on the sensed information.

For example, the detection circuit 122 determines that a rodent or other small mammal is approaching the ATM 102 (e.g., see environment shown in FIG. 6 described below) based on information received from the camera 132 and sensor 134 indicating the small size of the detected object, the location proximate the ground, the speed of the object, etc. As another example, the detection circuit 122 determines that a pigeon or other bird has landed on the ATM 102 based on information received from the camera 132 and sensor 134 indicating the small size of the detected object, the location in the air or on the ATM 102, the speed of the object, the movement of the object, etc. As another example, the detection circuit 122 determines that a human is crouched proximate the ATM 102 or an access panel of the ATM 102 (e.g., see environment shown in FIG. 7 described below). As a further example, the detection circuit 122 determines that a user is approaching the ATM 102 in a manner that suggests the user is attempting to use the ATM 102 for its intended purpose (e.g., performing a transaction at the ATM 102, etc.). In some arrangements, the detection circuit 122 can also detect or monitor the state of the hardware of the ATM 102. If a hardware failure or compromise is detected, the detection circuit 122 signals to the security level circuit 204 and/or the security circuit 124 to take an appropriate measure. For example, if the detection circuit 122 determines that there is a loss of the hardware's connectivity, which may indicate physical damage due to an intruder in the ATM 102, the detection circuit 122 communicates with the security level circuit 204 and/or the security circuit 124 to take the appropriate measure to deter the intruder. In some arrangements, if there is a power outage at the ATM 102 (e.g., a power cable has been chewed through), there is a battery backup feature that maintains the power temporarily at the ATM 102 until repairs can be made.

In some embodiments, the detection circuit 122 communicates the detected object information to the security level circuit 204 of the provider computing system 104. In some embodiments, the detection circuit 122 is configured to communicate the detected object information directly to the security circuit 124. Accordingly, the detection circuit 122 is communicably and operatively coupled to the security circuit 124.

The security circuit 124 is configured to receive the determined level of security defense measure to be used from the security level circuit 204 of the provider computing system 104 and to control the security device 136 to provide that level of security defense measure. For example, the detection circuit 122 determines that a rodent or small animal is detected near the ATM 102 and communicates that information to the security level circuit 204. The security level circuit 204 determines that a first level of security defense measure for rodent deterrence should be used. The security circuit 124 of the ATM 102 receives this communication and directs the security device 136 to emit predator sounds from the ATM 102. In other arrangements, as noted above, the security circuit 124 is configured to receive detected object information directly from the detection circuit 122 and determine the level of security defense measure in a similar manner as the security level circuit 204 of the provider computing system 104 as described below. The security circuit 124 then controls the security device 136 to perform the determined level of security defense measure. In instances where a level of security measure is determined at the ATM 102 (e.g., via security circuit 124), the security circuit 124 retrieves historical intruder and security defense measure information from the security event database 126 to determine a type and level of security defense measure that should be used to deter an intruder.

The security event database 126 is configured to retrievably store information pertaining to security defense measures previously used at the ATM 102 and the timing of such measures. The security event databased 126 may include non-transient data storage mediums (e.g., local disc or flash-based hard drives, local network servers, and the like) or remote data storage facilities (e.g., cloud servers). The security event database 126 also stores information regarding the status of ATM 102 including whether the ATM 102 is operational and whether the ATM 102 has been compromised in the past. In various arrangements, historical compromise or intruder information may include the date and time of a reported ATM intrusion, the type of intruder detected, the security measure used on the intruder, whether the security measure was successful, the number of times an ATM 102 has used security defense measures, etc.

Figure 3:
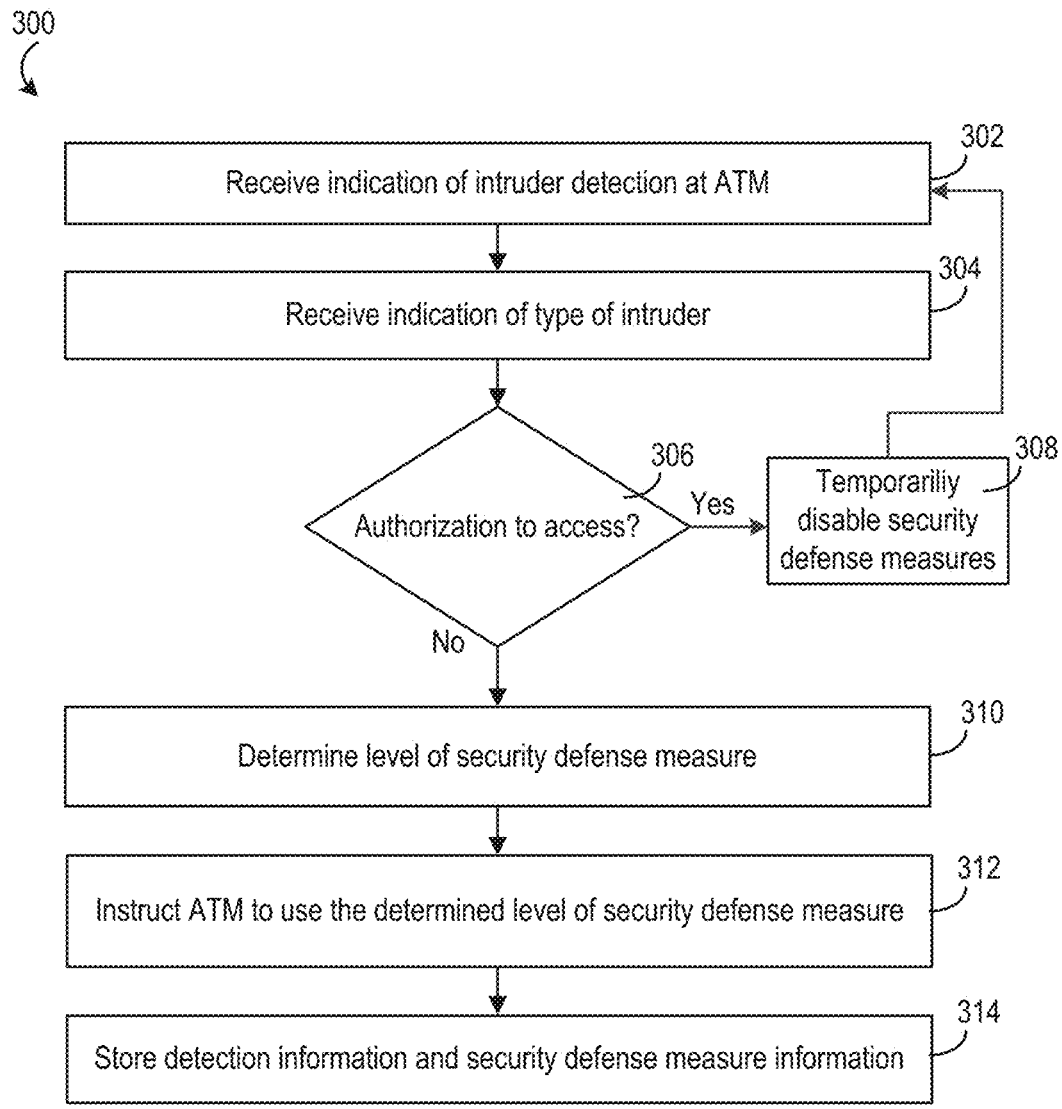
FIG. 3 is a process diagram depicting a method of providing a security defense measure at the ATM, according to an example embodiment.

Referring now to FIG. 3, a flow diagram of a method 300 of providing real-time ATM security defense measures is shown, according to an example embodiment. In various embodiments, the method 300 is performed by the components shown in FIGS. 1-2 such that reference may be made to the components of FIGS. 1-2 to aid the description of the method 300. In some arrangements, the method 300 is performed by the provider computing system 104.

An indication of an intruder detection at an ATM is received at 302. In some arrangements, the indication is received by the security level circuit 204. In some arrangements, the camera 132 and sensor 134 of the ATM 102 detect an intruder and the detection circuit 122 determines the type of intruder. In some arrangements, the indication can be received as part of a notification sent to the provider computing system 104 (e.g., message sent to employee of provider, text message to certain personnel, push message, etc.) that an intruder has been detected at the ATM 102. An indication of the type of intruder is received at 304. In some arrangements, the detection circuit 122 transmits the intruder information to the security level circuit 204. The same type of notification or an updated notification similar to the indication message can be sent to the provider computing system 104 to notify the provider of the intruder situation at the ATM 102.

It is determined whether an authorization to access the ATM exists at 306. In some arrangements, the authorization information is received by the authorization circuit 202 of the provider computing system 104. In some arrangements, an authorization request may be transmitted by a user device 130 of a user approaching the ATM 102. In some arrangements, the authorization request is received from the ATM 102 and includes information regarding the user at or approaching the ATM 102 (e.g., received from the user device 130, received in an input of the ATM 102). If an authorization to access the ATM exists, then the security defense measures are temporarily disabled at 308 and the process begins again at 302.

If an authorization to access the ATM does not exist, then the level of security defense measure is determined at 310. In some arrangements, the level of security defense measure is determined by the security level circuit 204. The level of security defense measure is determined based on the type of intruder detected and the historical security information for the ATM 102. The security level circuit 204 receives the intruder information from the detection circuit 122 of the ATM 102, which uses information gathered from a multi-sensory system, including one or more cameras 132 and sensors 134. The security level circuit 204 accesses the ATM database 206 to determine whether previous security defense measures have been used at the ATM 102, the type of defenses used, the type of intruder detected, and whether the defense measure was successful in deterring the intruder.

The ATM is instructed to use the determined security defense measure at 312. In some arrangements, the security level circuit 204 instructs the ATM 102 to use the determined security defense measure. The security information is stored at 314. In some arrangements, the security information is stored in the ATM database 206 for later retrieval by the authorization circuit 202 and security level circuit 204.

Figure 4:
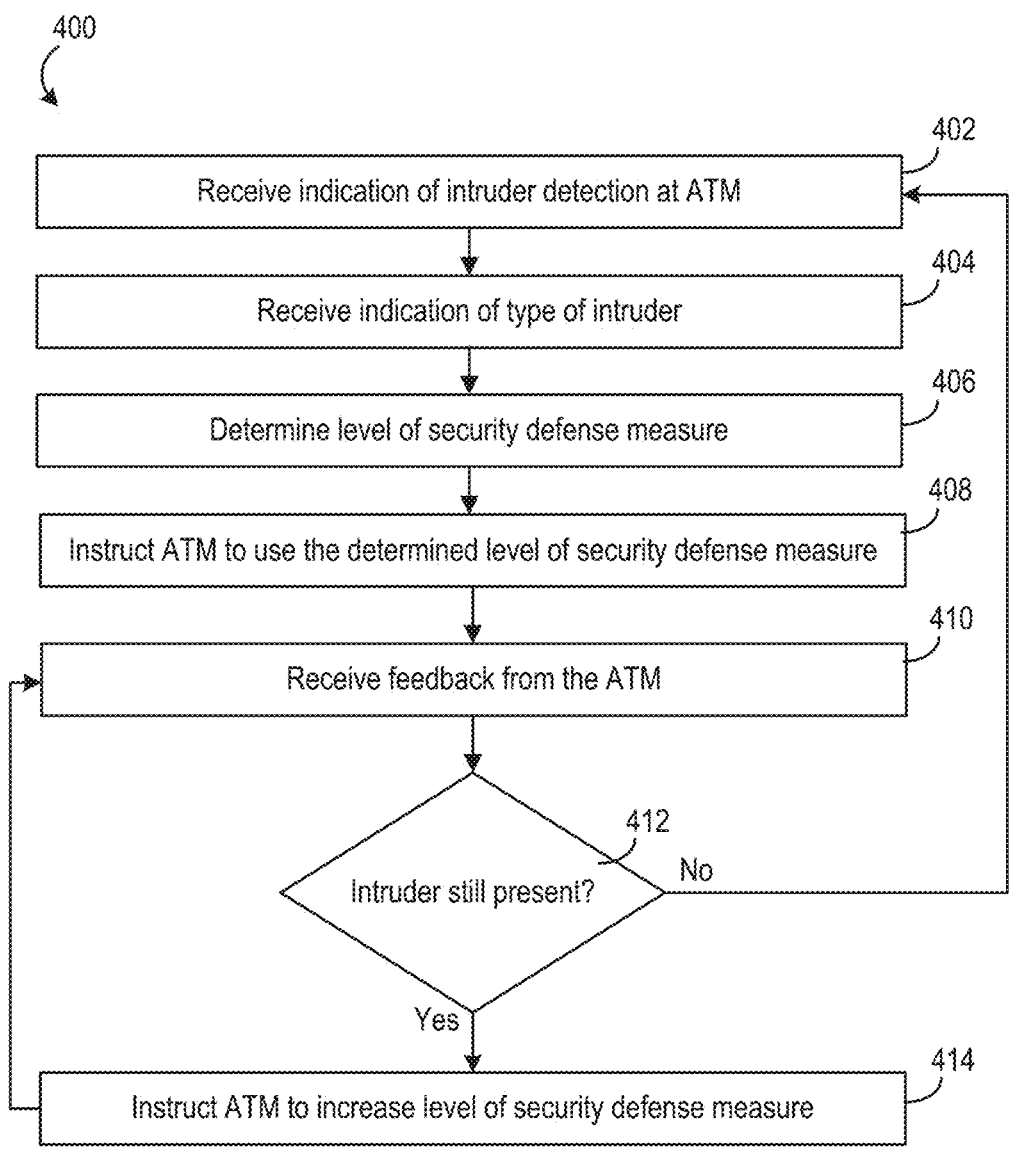
FIG. 4 is a process diagram depicting a method of providing a security defense measure at the ATM, according to an example embodiment.

Referring now to FIG. 4, a flow diagram of a method 400 of providing progressive real-time ATM security defense measures is shown, according to an example embodiment. In various embodiments, the method 400 is performed by the components shown in FIGS. 1-2 such that reference may be made to the components of FIGS. 1-2 to aid the description of the method 400. In some arrangements, the method 400 is performed by the provider computing system 104.

An indication of an intruder detection at an ATM is received at 402. In some arrangements, the indication is received by the security level circuit 204. In some arrangements, the camera 132 and sensor 134 of the ATM 102 detect an intruder and the detection circuit 122 determines the type of intruder. In some arrangements, the indication can be received as part of a notification sent to the provider computing system 104 (e.g., message sent to employee of provider, text message to certain personnel, push message, etc.) that an intruder has been detected at the ATM 102. An indication of the type of intruder is received at 404. In some arrangements, the detection circuit 122 transmits the intruder information to the security level circuit 204. The same type of notification or an updated notification similar to the indication message can be sent to the provider computing system 104 to notify the provider of the intruder situation at the ATM 102.

The level of security defense measure is determined at 406. In some arrangements, the level of security defense measure is determined by the security level circuit 204. The level of security defense measure is determined based on the type of intruder detected and the historical security information for the ATM 102. The security level circuit 204 receives the intruder information from the detection circuit 122 of the ATM 102, which uses information gathered from a multi-sensory system, including one or more cameras 132 and sensors 134. The security level circuit 204 accesses the ATM database 206 to determine whether previous security defense measures have been used at the ATM 102, the type of defenses used, the type of intruder detected, and whether the defense measure was successful in deterring the intruder.

The ATM is instructed to use the determined security defense measure at 408. In some arrangements, the security level circuit 204 instructs the ATM 102 to use the determined security defense measure. Feedback is received from the ATM 102 at 410. In some arrangements, the feedback information is received by the security level circuit 204. The feedback information can include information as to whether the intruder is still attempting to access the ATM 102, whether the intruder is retreating, and other movements of the intruder. It is determined whether the intruder is still present at 412. If the intruder is determined to still be present at or near the ATM 102, the ATM 102 is instructed to increase the security defense measure to the next level at 414. In some arrangements, the ATM is instructed by the security level circuit 204. As an example, the ATM is instructed to progressively increase the security defense measure from a first level to a second level, from a second level to a third level, etc. If the intruder is determined to be retreating, the process begins again at 402.

Figure 5:
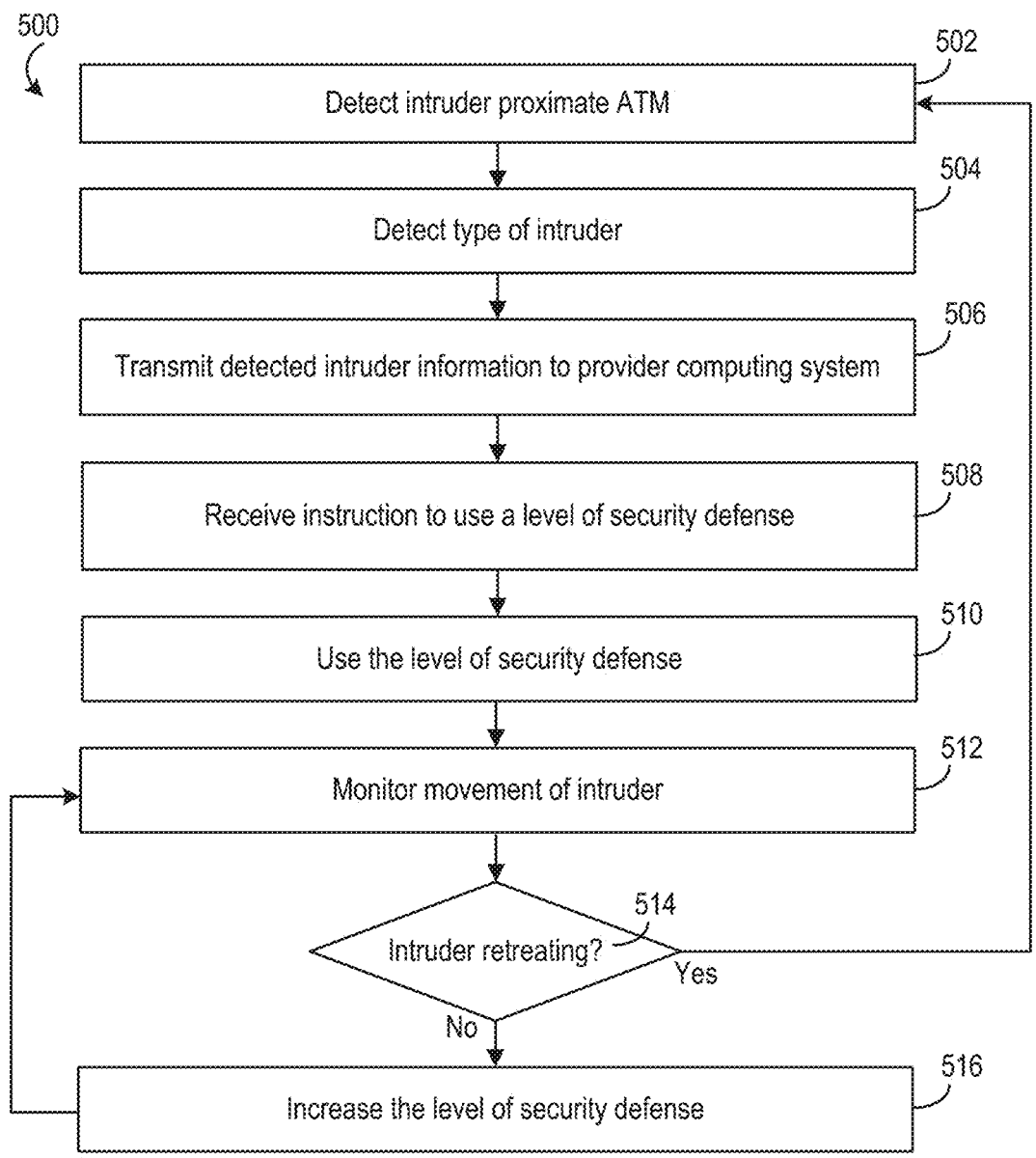
FIG. 5 is a process diagram depicting a method of providing a security defense measure at the ATM, according to an example embodiment.

Referring now to FIG. 5, a flow diagram of a method 500 of providing progressive real-time ATM security defense measures is shown, according to an example embodiment. In various embodiments, the method 500 is performed by the components shown in FIGS. 1-2 such that reference may be made to the components of FIGS. 1-2 to aid the description of the method 500. In some arrangements, method 500 is performed by the ATM 102 and components thereof.

An intruder is detected proximate the ATM at 502. In some arrangements, the intruder is detected by components of the input/output device 120 of the ATM 102. For example, a camera 132 can record the activity occurring proximate the ATM 102, which can then be analyzed by the various circuits included with the ATM 102 and can be transmitted to the provider computing system 104 for analysis and storage. As a further example, a motion detector sensor is included with the ATM 102 to detect movement of objects near the ATM 102. As noted above, in some arrangements, the sensor 134 and camera 132 can be used in a combined arrangement such that operation of the camera 132 is triggered by the sensor 134.

The type of detected intruder is determined at 504. In some arrangements, the type of detected intruder is determined by the detection circuit 122. In some arrangements, the camera 132 and sensor 134 sense various information relating to the detected intruder, including the movement, placement, and size of the object. The object information is communicated to the detection circuit 122, which determines the type of detected intruder based on the sensed object information. The detected intruder information is transmitted to the provider computing system at 506. In some arrangements, the detected intruder information is transmitted by the detection circuit 122. In some arrangements, the detected intruder information is transmitted to the provider computing system 104 as part of a notification or message (e.g., message sent to employee of provider, text message to certain personnel, push message, etc.) that an intruder has been detected at the ATM 102. An instruction to use a security defense measure is received at 508. In some arrangements, the instruction is received by the security circuit 124.

The security defense measure is employed at 510. In some arrangements, the security circuit 124 communicates with the security device 136 to use the security defense measure. The security device 136 is configured to perform a security defense measure to deter intruders detected at, in, or near the ATM 102. In various examples, the security device 136 includes a noise emission device, an odor emission device, a light, a chemical emission device, a robotic device, etc. Based on the level of security defense measure, the security device 136 uses different types of security devices, which can be used alone or in combination with other security devices.

The movement of the intruder is monitored at 512. In some arrangements, the movement of the intruder is monitored by the one or more cameras 132 and sensors 134 of the ATM 102. It is determined whether the intruder is retreating at 514. In some arrangements, this determination is made by the detection circuit 122. The detection circuit 122 receives sensed information from the camera 132 and sensor 134 and analyzes the sensed information to determine if the intruder is retreating. If the intruder is retreating, the process begins again at 502. If the intruder is not retreating, the level of security defense measure is increased at 516. In some arrangements, the level of security defense measure is determined by the security level circuit 204 of the provider computing system 104 as described above. In other arrangements, the level of security defense measure is determined by the security circuit 124 of the ATM 102.

Figure 6:
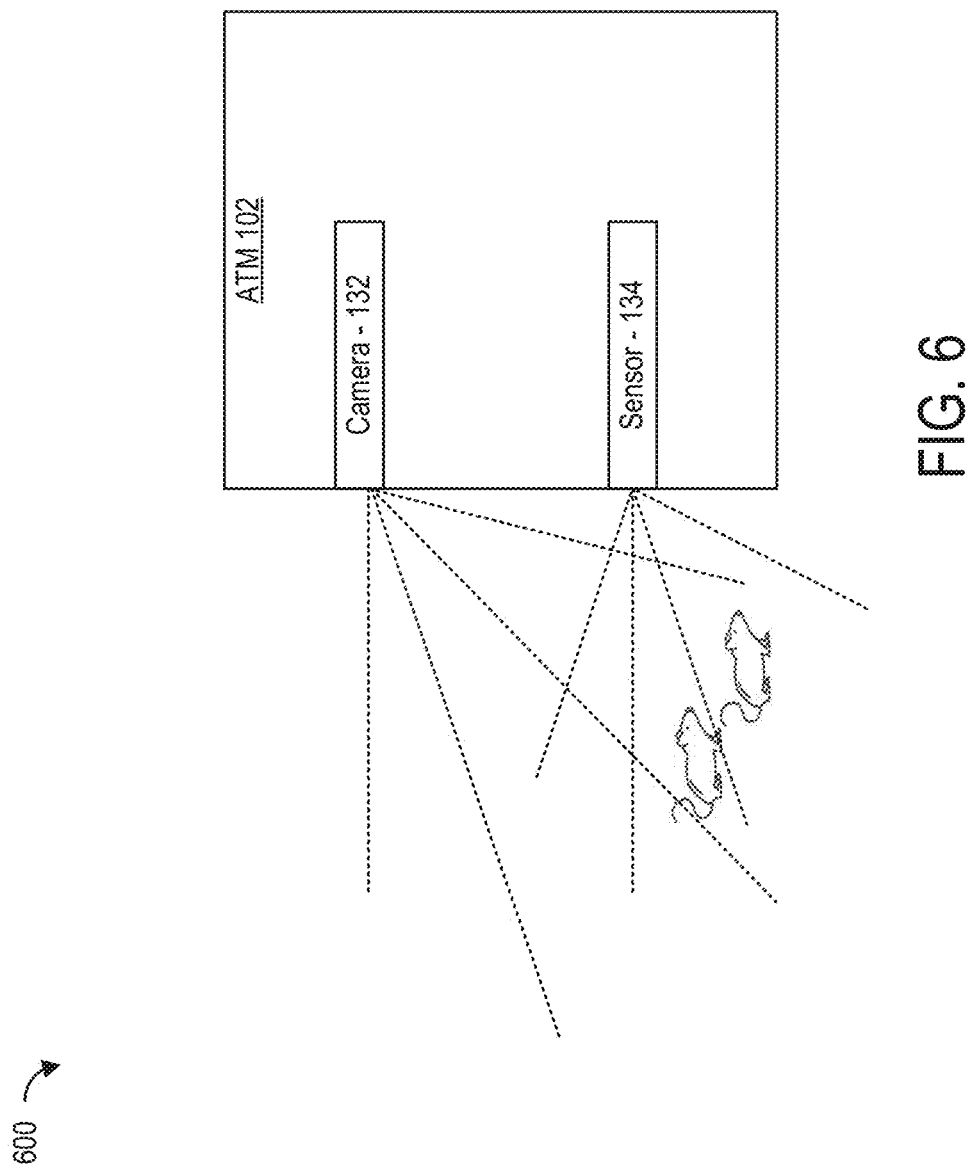
FIG. 6 is a schematic diagram depicting an environment in which the ATM security management system of FIG. 1 is used, according to an example embodiment.

Referring to FIG. 6, an environment in which an intruder is approaching the ATM 102 is shown, according to an example embodiment. In the example environment shown, the intruder is a pair of small animals approaching the ATM 102. As the animals approach the ATM, they are detected by the camera 132 and/or sensor 134. The ATM 102, through the various circuits described above, determines that the intruder is a small animal and communicates with the provider computing system 104 to determine an appropriate level of security defense measure to be used to deter the animals. For example, an noise or odor emission is used to deter the animals. In a case where the animals are not deterred due to a first level of security defense measure, a second, higher, level of security defense measure is used.

Figure 7:
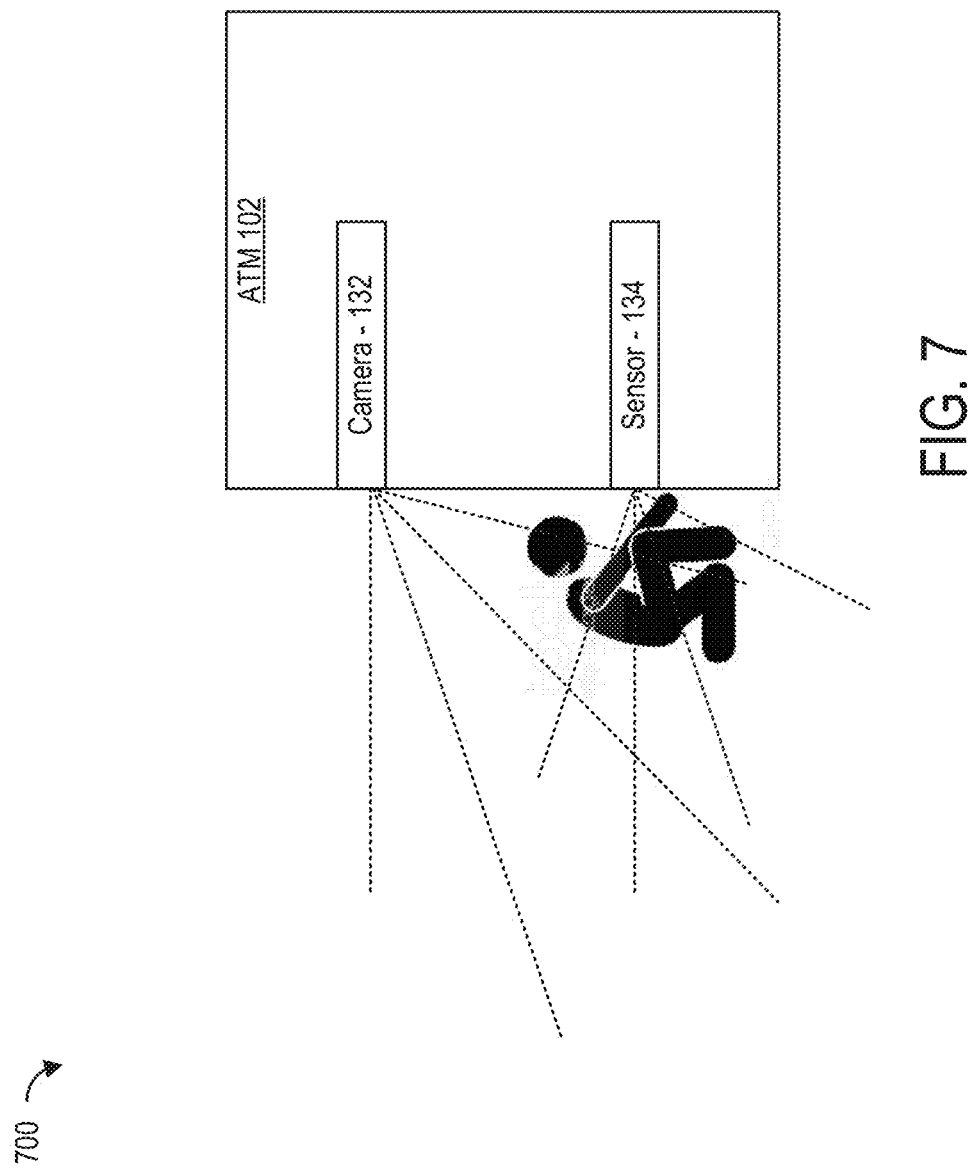
FIG. 7 is a schematic diagram depicting an environment in which the ATM security management system of FIG. 1 is used, according to an example embodiment.

Referring to FIG. 7, an environment in which a human is crouching at the ATM 102 is shown, according to an example embodiment. As shown, the human is proximate the ATM 102 and the camera 132 and sensor 134 are detecting the human. In some embodiments, the human is a user associated with the provider (e.g., with the provider computing system 104). In some instances, the user is carrying a user device 130 while approaching the ATM 102 and uses the user device 130 to initiate an authorization request to physically access the ATM 102 without the possibility of security defense measures being used. In some instances, the user approaches the ATM 102 and enters a code or other indication (e.g., fingerprint, card insertion, etc.) that identifies the user as having authorized access to the ATM 102. If authorization access is not granted, the ATM 102 will communicate with the provider computing system 104 as described above, to determine which security defense measures to use against the human. In some arrangements, the system 100 determines to notify security services of the provider computing system 104 or law enforcement.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively, or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
    detecting, by an automated teller machine (ATM), an intruder proximate the ATM using sensed detection information;
    determining, by the ATM, intruder type information based on the sensed detection information, wherein the intruder type information indicates that the intruder is a specific type of a non-human creature intruder and the intruder type information includes measurements associated with the intruder including a speed of travel and a location relative to the ground, and wherein the intruder type information further discerns between a plurality of specific type, non-human creature intruders;
    transmitting, by the ATM, the intruder type information to a provider computing system;
    receiving, by the ATM from the provider computing system, an instruction to use a level and a type of security defense measure based on the intruder type information, wherein the type of security defense measure is further based on an analysis of historical intruder log data associated with the specific type of intruder;
    deploying, by the ATM, the level and the type of security defense measure;
    monitoring, by the ATM, a movement of the intruder in accordance with the level and the type of security defense measure;
    transmitting, by the ATM to the provider computing system, a feedback information that includes the movement of the intruder;
    receiving, by the ATM from the provider computing system, a feedback instruction message;
    determining, by the ATM, whether to use an increased level of security defense measure based on the feedback instruction message;
    logging, by the ATM, an intrusion event, wherein the intrusion event comprises the intruder type information, the level and the type of security defense measure used, and an indication of whether the security defense measure was successful in deterring the intruder;
    transmitting, by the ATM, the intrusion event to a database containing historical intruder log data, the database associated with the provider computing system.

2. The method of claim 1, wherein the level of security defense measure comprises a first level of security defense measure and the increased level of security defense measure comprises a second level of security defense measure;
    wherein the method further comprises:
        determining, by the ATM, that the movement of the intruder is away from the ATM; and
        disabling, by the ATM, a deployment of the second level of security defense measure based on the feedback instruction message.

3. The method of claim 1, wherein the level of security defense measure comprises a first level of security defense measure and the increased level of security defense measure comprises a second level of security defense measure;
    wherein the method further comprises:
        determining, by the ATM, that the movement of the intruder is toward the ATM; and
        deploying, by the ATM, the second level of security defense measure based on the feedback instruction message.

4. The method of claim 1, further comprising:
    receiving an authorization request from a user device proximate the ATM, wherein the authorization request includes user identity information;
    transmitting the authorization request to the provider computing system;
    receiving an authorization approval from the provider computing system indicating that the intruder comprises an authorized user that has been granted physical access to the ATM; and
    temporarily disabling, by the ATM, all security defense measures.

5. The method of claim 1, further comprising:
    receiving, by the ATM, an authorization approval from the provider computing system indicating that the intruder comprises an authorized user that has been granted physical access to the ATM; and
    temporarily disabling, by the ATM, all security defense measures.

6. The method of claim 1, further comprising:
    transmitting, by the ATM, a message to the provider computing system indicating the movement of the intruder in response to the level of security defense measure.

7. The method of claim 1, wherein the intruder is detected by at least one of a camera and a sensor at the ATM.

8. The method of claim 1, wherein the intruder is detected by a combination of a camera and a sensor at the ATM.

9. The method of claim 1, wherein the increased level of security defense measure is at least one of an odor emission, a chemical emission, or a robotic device.

10. An automated teller machine (ATM), comprising:
a network interface;
an input/output device;
a security device configured to use security defense measures against an intruder detected proximate the ATM;
a processing circuit comprising one or more processors coupled to non-transitory memory, the processing circuit configured to:
   detect the intruder proximate the ATM using sensed detection information;
   determine intruder type information based on the sensed detection information, wherein the intruder type information indicates that the intruder is a specific type of a non-human creature intruder and the intruder type information includes measurements associated with the intruder including a speed of travel and a location relative to the ground, and wherein the intruder type information further discerns between a plurality of specific type, non-human creature intruders;
   transmit, through the network interface, the intruder type information to a provider computing system;
   receive, through the network interface, from the provider computing system, an instruction to use a level and a type of security defense measure based on the intruder type information, wherein the type of security defense measure is further based on an analysis of historical intruder log data associated with the specific type of intruder;
   deploy, by an operation of the security device, the level and the type of security defense measure;
   monitor a movement of the intruder in accordance with the level and the type of security defense measure;
   transmit, through the network interface, to the provider computing system, a feedback information that includes the movement of the intruder;
   receive, through the network interface, from the provider computing system, a feedback instruction message;
   determine whether to use an increased level of security defense measure based on the feedback instruction message;
   log an intrusion event, wherein the intrusion event comprises the intruder type information, the level and the type of security defense measure used, and an indication of whether the security defense measure was successful in deterring the intruder; and
   transmit, the intrusion event to a database containing historical intruder log data, the database associated with the provider computing system.

11. The ATM of claim 10, wherein the level of security defense measure comprises a first level of security defense measure and the increased level of security defense measure comprises a second level of security defense measure;
   wherein the processing circuit is further configured to:
      determine that the movement of the intruder is away from the ATM; and
      disable a deployment of the second level of security defense measure based on the feedback instruction message.

12. The ATM of claim 10, wherein the level of security defense measure comprises a first level of security defense measure and the increased level of security defense measure comprises a second level of security defense measure;
   wherein the processing circuit is further configured to:
      determine that the movement of the intruder is toward the ATM; and
      deploy, by another operation of the security device, the second level of security defense measure based on the feedback instruction message.

13. The ATM of claim 10, wherein the processing circuit is further configured to:
   receive, through the network interface, an authorization request from a user device proximate the ATM, wherein the authorization request includes user identity information;
   transmit, through the network interface, the authorization request to the provider computing system;
   receive, through the network interface, an authorization approval from the provider computing system indicating that the intruder comprises an authorized user that has been granted physical access to the ATM; and
   temporarily disable all security defense measures.

14. The ATM of claim 10, wherein the processing circuit is further configured to:
   receive, through the network interface, an authorization approval from the provider computing system indicating that the intruder comprises an authorized user that has been granted physical access to the ATM; and
   temporarily disable all security defense measures.

15. The ATM of claim 10, wherein the processing circuit is further configured to:
   transmit, through the network interface, a message to the provider computing system reporting use of the level of security defense measure and a second message indicating the movement of the intruder in response to the level of security defense measure.

16. The ATM of claim 10, wherein the intruder is detected by at least one of a camera and a sensor at the ATM.

17. The ATM of claim 10, wherein the intruder is detected by a combination of a camera and a sensor at the ATM.

18. The ATM of claim 10, wherein the increased level of security defense measure is at least one of an odor emission, a chemical emission, or a robotic device.

19. A provider computing system, comprising:
a network interface; and
a processing circuit comprising one or more processors coupled to non-transitory memory, the memory comprising an automated teller machine (ATM) database, and wherein the processing circuit is configured to:
   receive, through the network interface, an indication of an intruder from an ATM;
   receive, through the network interface, intruder type information from the ATM, wherein the intruder type information indicates that the intruder is a specific type of a non-human creature intruder and the intruder type information includes measurements associated with the intruder including a speed of travel and a location relative to the ground, and wherein the intruder type information further discerns between a plurality of specific type, non-human creature intruders;
   determine a level and a type of security defense measure to be used at the ATM based on the intruder type information, wherein the type of security defense measure is further based on an analysis of historical intruder log data associated with the specific type of intruder;
   transmit, through the network interface, an instruction message to the ATM to use the level and the type of security defense measure;

receive, through the network interface, and store feedback information from the ATM, the feedback information including movement of the intruder in response to the level of security defense measure used, and wherein the feedback information is stored in a database containing historical intruder log data; and determine whether to instruct the ATM to use an increased level of security defense measure based on the movement of the feedback information.

20. The provider computing system of claim 19, wherein the level of security defense measure comprises a first level of security defense measure and the increased level of security defense measure comprises a second level of security defense measure;

wherein the processing circuit is further configured to:
determine that the feedback information indicates the movement of the intruder is away from the ATM; and
transmit, through the network interface, a feedback instruction message to the ATM to disable a deployment of the second level of security defense measure.

21. The provider computing system of claim 19, wherein the level of security defense measure comprises a first level of security defense measure and the increased level of security defense measure comprises a second level of security defense measure;

wherein the processing circuit is further configured to:
determine that the feedback information indicates the movement of the intruder is toward the ATM; and
transmit, through the network interface, a feedback instruction message to the ATM to deploy the second level of security defense measure.

22. The provider computing system of claim 19, wherein the processing circuit is further configured to:
receive, through the network interface, an authorization request from a user device proximate the ATM, wherein the authorization request includes user identity information;
approve the authorization request from the user device based on retrieved user identity information from the ATM database; and
transmit, through the network interface, an authorization message to the ATM.

23. The provider computing system of claim 22, wherein the processing circuit is further configured to:
transmit, through the network interface, a message to the ATM to instruct the ATM to temporarily disable all security defense measures in response to approving the authorization request from the user device.

* * * * *